United States Patent [19]

Tsui

[11] Patent Number: 5,793,323

[45] Date of Patent: Aug. 11, 1998

[54] TWO SIGNAL MONOBIT ELECTRONIC WARFARE RECEIVER

[75] Inventor: James B. Y. Tsui, Dayton, Ohio

[73] Assignee: The United States of America as represented by the Secretary of the Air Force, Washington, D.C.

[21] Appl. No.: 758,275

[22] Filed: Nov. 25, 1996

[51] Int. Cl.$^6$ .................................................. G01S 7/36
[52] U.S. Cl. ............................................ 342/13; 342/196
[58] Field of Search ................................ 342/13–16, 17, 342/196; 324/76.21; 364/484, 485, 724.06

[56] References Cited

U.S. PATENT DOCUMENTS

| | | | |
|---|---|---|---|
| 3,581,199 | 5/1971 | Spitz | 324/76.24 |
| 3,774,201 | 11/1973 | Collins | 324/76.24 |
| 3,819,920 | 6/1974 | Goldfischer | 235/152 |
| 3,903,401 | 9/1975 | Jayant | 235/156 |
| 4,084,251 | 4/1978 | Gillis, Jr. | 364/726 |
| 4,772,889 | 9/1988 | Elleaume | 342/194 |
| 4,818,949 | 4/1989 | Cohen | 324/76.22 |
| 4,899,289 | 2/1990 | Appel | 364/484 |
| 4,970,674 | 11/1990 | White | 364/726 |
| 5,059,968 | 10/1991 | Thompson et al. | 342/152 |
| 5,093,801 | 3/1992 | White et al. | 364/726 |
| 5,262,957 | 11/1993 | Hearn | 364/485 |
| 5,303,172 | 4/1994 | Magar et al. | 364/726 |
| 5,305,007 | 4/1994 | Orr et al. | 342/20 |
| 5,499,391 | 3/1996 | Tsui | 455/226.2 |
| 5,508,538 | 4/1996 | Fijany et al. | 257/214 |

Primary Examiner—Harold J. Tudor
Assistant Examiner—Christopher K. Montgomery
Attorney, Agent, or Firm—Gerald B. Hollins; Thomas L. Kundert

[57] ABSTRACT

A broadband gigahertz frequency range radio receiver useful in electronic warfare and other applications for incoming signal detection and identification purposes. The receiver is based on Fourier transform examination of incoming signal characteristics and provides real time accomplishment of these tasks by way of using a simplified one-bit digital representation of the incoming signals and a resulting reduction of the computational load associated with the Fourier transform operation. The receiver precedes the Fourier transform operation with signal processing which may include, for example, a limiting amplifier and two bandpass filters. Two incoming signal accommodation is provided, a characteristic which is particularly improved over the characteristics of popular presently used receivers in this field.

5 Claims, 3 Drawing Sheets

TWO SIGNAL MONOBIT ELECTRONIC WARFARE RECEIVER

RIGHTS OF THE GOVERNMENT

The invention described herein may be manufactured and used by or for the Government of the United States for all governmental purposes without the payment of any royalty.

BACKGROUND OF THE INVENTION

This invention concerns the field of wide spectrum radio frequency signal receivers having signal frequency identifying capability and possible electronic warfare usage.

In the field of electronic warfare a broadband radio receiver such as the "Instantaneous Frequency Measurement" (IFM) receiver is often used as a defensive tool to sense the illumination of a target by an incoming radio frequency signal such as a radar signal. This same receiver is also used to analyze the nature of the illuminating signal with respect to its carrier frequency, pulse width and other characteristics. A conventional IFM receiver is, however, a phase responsive device and, moreover, is limited to the processing of only one input signal at a time.

If two signals arrive at such an IFM receiver, the receiver's inherent phase-operated nature becomes a dominant consideration and the receiver may in fact generate erroneous frequency information and otherwise become unpredictable—all without the operator being alerted to a difficulty. This and other characteristics of an instantaneous frequency measurement receiver may be better understood from a consideration of my U.S. Pat. No. 5,499,391 which is concerned with a digitized arrangement of an instantaneous frequency measurement receiver; the contents of which are hereby incorporated by reference herein. Although various improvements have been suggested to detect and announce the existence of simultaneous signal difficulties in such a receiver, these changes have achieved only limited degrees of success and after a period of frustration have, therefore, provided an incentive for the present entirely different approach to realization of a broadband electronic warfare receiver.

The role of an improved electronic warfare radio receiver in the present environment is therefore to provide an operator with information indicating that a search signal, a signal originating from, for example, a hostile radar apparatus, has found or at least been received at the operator's location. This search signal may be as brief in its time duration as a single pulse of radio frequency carrier signal—as indeed is in accordance with the practice used in modern stealth-considered radar equipment. From this brief received signal, it is nevertheless desirable to determine as much information as possible about the signal's originating radar apparatus, especially such information as the carrier frequency and the pulse characteristics of the radar.

Although there exists a number of different types of wide band radio receivers which can perform these functions of an electronic warfare receiver under idealized conditions, most of these receivers are large in physical size and expensive to build and maintain. In addition, when the above-described two signals arrive simultaneously at the currently popular instantaneous frequency measurement version of these receivers, i.e., two signals which are concurrent within a time interval such as one-tenth of a microsecond, a signal processing difficulty is encountered. The processing of two signals which are separated by a time interval greater than this one-tenth microsecond is, of course, a much easier accomplishment and can be performed by a number of different broadband receiver types. Such a task is, therefore, of only background interest with respect to the present invention.

The presence of two signal sources of this close time concurrence and different frequency content is, however, readily accommodated in the new type of radio receiver disclosed in the present document. This receiver is based on real time application of the discrete Fourier Transform mathematical function. The Fourier transform concepts used in the present invention receiver have, of course, been known and used in other equipment for some time. However, difficulties in mechanizing certain parts of such apparatus in real time and in the gigahertz operating frequency environment of current-day electronic warfare interest (and within the size and weight limitations imposed by airborne or portable equipment requirements) have heretofore precluded use of such receivers for most non-laboratory purposes, including military receivers.

The radio receiver of the present invention is perceived to fulfill a need in this field for a more reliable and foolproof apparatus for detection of and characteristic identification of incoming signals, an apparatus which performs in a reliable and predictable manner in the presence of one or two incoming radio frequency signals and is suitable for in the field usage. The present invention departs from the phase operated concepts of the IFM receiver and is believed to provide greater reliability and other advantages while also providing a receiver of relatively small physical size and overall simplicity.

The U.S. patent art indicates the presence of significant inventive activity in the area of broad spectrum radio receivers and in radio receivers and other apparatus which employ a Fourier transform function in order to examine frequency-related aspects of incoming signals. The present invention is, however, believed distinguished over the several inventions of this prior art by its specific treatment of the Fourier transform function and by the large demands, placed on this Fourier transform realization in the real-time environment of a microwave band electronic warfare receiver.

SUMMARY OF THE INVENTION

The present invention provides a relatively small and simplified version of a digital broad spectrum radio receiver, a receiver having a simplified real-time Fourier transform realization and reception capability for at least two simultaneous signals.

It is an object of the present invention to provide a broad spectrum radio receiver having multiple signal input capability.

It is another object of the present invention to provide a broad spectrum radio receiver suitable for aircraft or in the field use.

It is another object of the present invention to provide a broad spectrum radio receiver in which the Fourier transform mathematical function is used as a spectral analysis tool.

It is another object of the present invention to provide a broad spectrum radio receiver in which a real-time high frequency realization of a Fourier transform operation is achieved.

It is another object of the present invention to provide a broad spectrum radio receiver in which a complex Fourier transform related mathematical multiplication is accomplished in a simplified and easily realizable manner.

It is another object of the present invention to provide a broad spectrum radio receiver in which highly complex nonlinear signal processing, processing incapable of mathematical analysis, is accomplished.

It is another object of the present invention to provide a broad spectrum radio receiver which combines nonlinear signal processing with simplified discrete Fourier transform realization in an effective but essentially mathematically non-analyzable manner.

Additional objects and features of the invention will be understood from the following description and claims and the accompanying drawings.

These and other objects of the invention are achieved by the method of characterizing one or two substantially coincident pulse-modulated electronic warfare radio frequency receiver signals, said method comprising the steps of:

converting said radio frequency receiver signals from an incident analog format to a digital format of single binary bit amplitude coding;

generating a discrete Fourier transform representation of said single binary bit amplitude-coded radio frequency receiver signals, said generated Fourier transform representation including a plurality of Fourier transform coefficient signal outputs each of known Fourier frequency association and of magnitude determined by waveform characteristics of said radio frequency receiver signals;

determining by amplitude comparison of said Fourier transform coefficient signal outputs which of said Fourier transform coefficient signal outputs have sufficient signal amplitude to represent a true identifying characteristic frequency of said received radio frequency signals.

DETAILED DESCRIPTION

Figure 1:
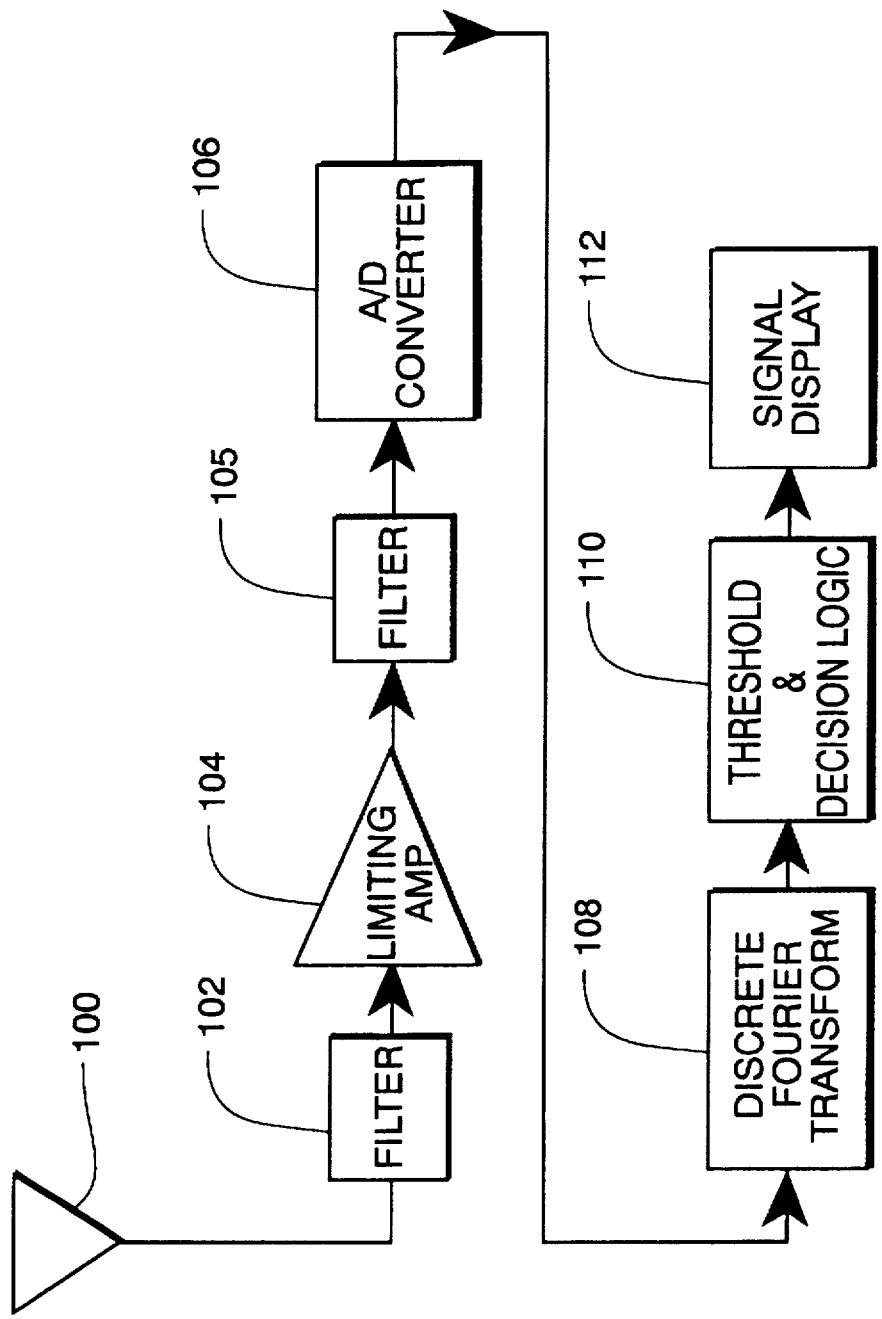
FIG. 1 shows a functional block diagram of apparatus which may be used to embody the present invention.

Conventional wisdom in the electrical arts suggests the implementation of a Fourier transform function with electronic components necessarily includes the mechanization of complex mathematical multiplications, i.e., the consideration of real and imaginary components in the mathematical quantities or signals appearing in the Fourier transform equation. In addition, the consideration of amplitude representations requiring several binary bits of data for signal magnitude definition is also required by this conventional wisdom approach to the Fourier transform. These requirements are usually considered to be necessary in order to avoid the generation of spurious frequency components in the achieved Fourier transform function. Stated more concisely, it is an accepted concept that simplification of the complex number multiplications and the amplitude representations called for in generating a Fourier transform results in the introduction of undesirable spurious or false Fourier transform output components.

According to this conventional wisdom, it is difficult to mechanize a Fourier transform-inclusive mathematical algorithm in apparatus which operates in real time at higher radio frequencies—since real and imaginary number-related quantities each represented by a plurality of binary bits are to be processed and the available processing time is quite limited. As a result, off line processing is required in most signal processing instances which involve a Fourier transform or related mathematical operations performed on input data that is of any appreciable radio frequency spectral bandwidth. Under these conditions, the processing of the present invention, for example, wherein signals of gigahertz radio frequency carrier and one-tenth microsecond to continuous wave modulation rate are encountered, i.e., signals used in radar and electronic warfare systems, would clearly be relegated to the realm of off line processing if the arrangement of the present invention or some other improvement were not available.

On the other hand, the above described limitations of presently available electronic warfare radio receivers, such as the phase operated IFM receiver, call for a different approach to configuring receivers used for these purposes. This different approach could well be based on the frequency component identification capability of a Fourier transform if such a transform (with its large number of mathematical multiplications and summations) could be implemented in electronic hardware (or even more wistfully in computer software) form to operate in real time at the radio frequency carrier and pulse modulation rates encountered in such receivers. Even though the prior art identified in connection with the present patent document indicates a number of inventors have implemented a Fourier transform function using a reduced number of computational steps and faster throughput rates, it is believed that none of these efforts have approached the processing rates and the operating bandwidth needed in a present-day electronic warfare receiver and that the following described apparatus is alone in reaching these extremes.

The present invention is based on the use of a single-bit digital representation of an incoming signal, i.e., on the use of an analog-to-digital converter's representation of the incoming signal by a single bit of unitary magnitude with only changes of polarity between positive and negative value of this single bit representing variations in the incoming analog signal. This single bit-represented signal is used in the present invention as one term, the x(n) term, in the well-known Fourier series transform mathematical expression of:

$$X(k) = \sum_{n=0}^{N-1} x(n) e^{\frac{-j2\pi nk}{N}}.$$

where x(n) are input data points and N is the total number of data points. In this equation, the x(n) values are herein represented by either +1 or −1 values in view of the one-bit digitization or analog-to-digital conversion used; thus, there is no multiplication required in implementing the equation. The remaining operations required are the summations, operations which can be accomplished very quickly. This is a significant advantage of the employed one-bit analog-to-digital conversion. Although the above equation can be implemented in many different ways, e.g., through software or hardware, the most challenging task is to make the transformation operate at near real time. A reduction of the x(n) term in this expression to merely a change of sign in a term of unit or magnitude one amplitude is, therefore, a major convenience and a major computation complexity-saving approximation in the present invention.

Even though these simplification and time conserving benefits may have been considered by others skilled in the Fourier transform implementation art, there is ample reason for not heretofore having seized upon a use of these concepts in arranging a wide spectrum electronic warfare radio receiver. A major aspect of these reasons attends the quite reasonable belief that a single bit, sign-only representation of a Fourier transform input signal term results in a Fourier transform output function, i.e., a sequence of Fourier series coefficients, which includes such a large quantity of false or spurious Fourier components as to make the transformed signal of little practical value. Indeed, this is a factor deserving of consideration in the present invention; however, the achieved results are believed to be properly classified as surprising.

A degree of theoretical support for this "transformed signal of little practical value" concept may be found in the classic technical literature. For example, in the textbook "Digital Communications by Satellite" authored by J. J. Spilker Jr. Ph.D. and published by Prentice-Hall Incorporated of Englewood Cliffs, N.J., beginning at the bottom of page 550 in topics titled "Worldwide Timing by Satellite Relay" and "Delay-Lock Tracking of Pseudonoise Signals", there is a discussion of the effects of one-bit quantizing of a received signal. This discussion ends with a conclusion that a suppression or loss of correlation (essentially a degradation of signal-to-noise ratio)on the order of 1.96 dB in magnitude is one possibly harmful effect of a one-bit quantizing arrangement.

One tempering aspect of this "transformed signal of little practical value" concept occurs with a realization that, for example, much of the Global Position Sensing (GPS) equipment in use today is based on a single bit binary representation of an input signal. It is notable, however, that this GPS use of single bit signal representation occurs in a fixed frequency environment, i.e., the input spectrum for a GPS receiver is quite narrow as compared with that for an electronic warfare radio receiver. In addition, GPS signal processing usually occurs in an environment of constant signal strength. Despite the more difficult wide spectrum and different signal strength conditions of the present invention receiver, the achieved results with a single bit analog-to-digital conversion are believed surprising.

FIG. 1 in the drawings shows the seven major components of a digital one bit broadband radio receiver according to the present invention, a receiver suitable for use in electronic warfare environments which possibly involve the reception of two coincident incoming radio frequency signals. In the FIG. 1 drawing, an antenna 100 or some other radio frequency energy source provides electrical input signals of a broadband spectrum to a series of signal processing circuits which include a filter element 102, a limiting amplifier 104, a second filter element 105, an analog-to-digital converter 106, a discrete Fourier transform generating circuit 108, a threshold and decision logic array 110 and a signal display 112. The radio receiver of FIG. 1 is, for example, intended for use in the one to two gigahertz band of radio frequencies and is intended to provide a reception bandwidth inclusive of, for example, a one gigahertz spectrum spread in this band.

In the FIG. 1 drawing, the radio frequency signals received from the antenna 100 or other signal source are first passed through the bandpass filter 102 in order to attenuate signals outside the band of interest from subsequent processing in the receiver—signals such as may arise, for example, from a nearby radio frequency energy source of different frequency but relatively large signal strength. A limiting amplifier 104 is used to obtain signals of uniform amplitude from the output of filter 102 and an additional bandpass filter 105 is used to remove undesired frequency components inherently introduced by the action of this limiting amplifier. The bandpass filter 105 is provided with a passband corresponding with the receiver's input frequency and reception bandwidth.

The one-bit analog-to-digital conversion of pulse modulated radio frequency carrier signals is accomplished in the analog-to-digital converter 106 in FIG. 1. The output of the analog-to-digital converter preferably consists of digital signals of unit value, either positive or negative in polarity and of time duration determined by both the received signal's radio frequency carrier and modulation waveform as indicated above. The output of the analog-to-digital converter is of this positive or negative amplitude of magnitude one according to the polarity of the input signal; additionally, this output desirably excludes a zero or other intermediate amplitude value; i.e., the output is true binary in nature, with plus one and minus one being the binary values. Since the input signal is of an alternating current and symmetrical about the zero volt axis nature, the analog-to-digital converter output also has no direct current component.

A one bit digitizer as provided by the analog-to-digital converter 106 in FIG. 1 is in fact the simplest type of digitizer available. There are also advantages provided by the use of this type of analog-to-digital converter in the present invention. The digital signal processing, required following this type of analog-to-digital converter, is simpler than for a more complex converter. Additionally, such an analog to-digital converter can operate at very high frequency, thus, it can accommodate a very wide receiver input bandwidth. The disadvantage of such an analog-to-digital converter is that the instantaneous dynamic range of any simultaneously processed signals will be rather low. However, since the receiver discussed in the present invention is only intended to process a maximum of two simultaneous signals, a one-bit analog-to-digital converter does not create a serious receiver performance problem. Needless to say, if an analog-to-digital converter of greater bit capacity is used at 106 to embody the present receiver, the complexity of the receiver will increase; however, the achieved instantaneous dynamic range (i.e., the ability to process concurrent signals of differing amplitude) can be improved.

The frequency spectrum of the signals comprising the one bit output of the analog-to-digital converter 106 becomes manifest in the discrete Fourier transform circuit 108 in FIG. 1. The output of this circuit includes a plurality of signals each representing the magnitude of a Fourier series term coefficient, i.e., representing the amplitude of one component signal of selected Fourier frequency, which appears in the analog-to-digital converter 106 output signal. Since real time operation at incoming signal-determined rates is desirable in the analog-to-digital converter circuit 106 and in the discrete Fourier transform generating circuit 108, a high speed-capable discrete Fourier transform arrangement is desirable for use at 108. Although arranging a Fourier transform circuit to operate in real time at the gigahertz operating frequencies of the FIG. 1 apparatus is not an easily accomplished task in the present state of the electronic art, such a circuit is believed possible with the simplified multiplication provided by the present invention.

Figure 2:
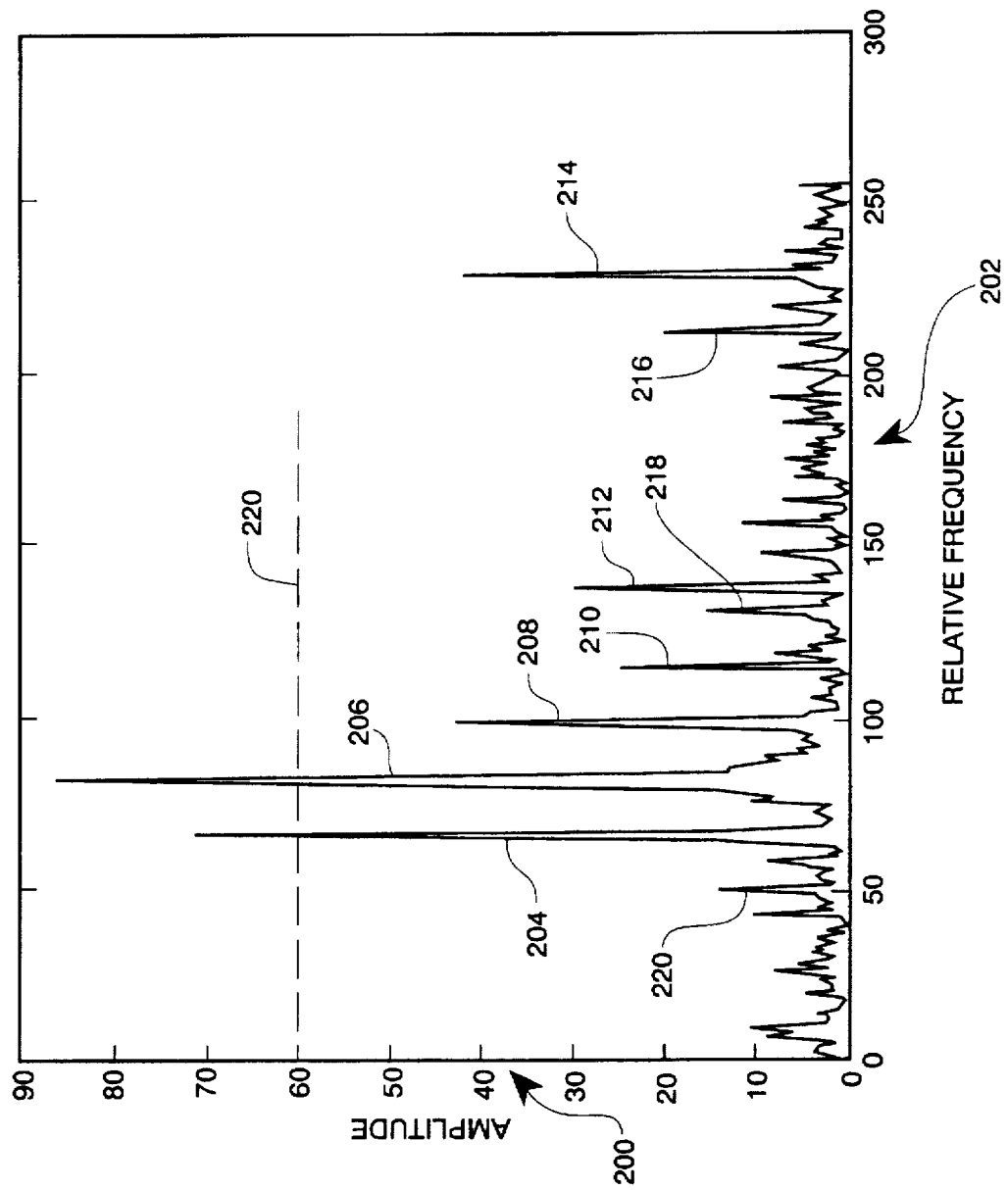
FIG. 2 shows a typical Fourier transform spectrum output resulting from two coincident input signals being received by a radio receiver according to the invention.

FIG. 2 in the drawings shows an amplitude versus frequency plot of typical output signals expected from the discrete Fourier transform generating circuit 108 in the present invention, a plot of the output signals expected with two substantially concurrent input signals applied to the receiver's input. In the FIG. 2 drawing, signal amplitude is measured along the vertical axis 200 and Fourier transform component frequency or Fourier coefficient frequency is measured along the axis 202, the frequency measurement being understood to commence at some lower bandpass frequency which is identified with the relative frequency value of zero frequency in FIG. 2.

The major component frequencies of the particular FIG. 2 represented input signals, components occurring at frequencies of about 70 and 85 along the axis 202 scale—are indicated by the pulses 204 and 206, respectively. The waveform peaks at 208, 210, 212, 214, 216, 218 and 220 in the FIG. 2 drawing may represent either additional true Fourier transform component frequencies of the two input signals or alternately may comprise spurious signals generated by the digitization and Fourier transform processing of the analog-to-digital converter 106 and discrete Fourier transform generating circuit 108 in FIG. 2. As is known in the Fourier transformation art, the use of an abbreviated or simplified version of a Fourier transform input signal is particularly identified with the generation of spurious Fourier transform components of lesser amplitude as represented at 208, 210, 212, 214, 216, 218 and 220 in the FIG. 2 drawing.

It is generally not possible to distinguish between additional true Fourier transform component frequencies and spurious signals generated by the digitization and Fourier transform processing (i.e., the analog-to-digital converter 106 and discrete Fourier transform generating circuit 108 in FIG. 2). A surprising aspect of the present invention lies, however, in the fact that the desired single bit digitization of the analog-to-digital converter 106 generates a sufficient amount of information concerning the input signals, i.e., defines the input signals sufficiently well, to provide an output of the FIG. 2 type, especially in a variable input frequency environment.

A first blush estimate of processing results from a one-bit digitizer (such as in the analog-to-digital converter 106) by a person skilled in the transformation signal processing art might well, for example, predict that a large plurality of Fourier transform components of generally indistinguishable amplitude difference would be the only result from such a single-bit digitization and transformation process. Such indistinguishable results are at least suggested by the smaller signals represented at 208, 210, 212, 214, 216, 218 and 220 in the FIG. 2 drawing. As demonstrated by the larger signals 204 and 206 in the FIG. 2 and FIG. 3 drawings, however, this first blush estimate is not borne out by achieved results and in fact usable signals are obtained from such a one-bit signal representation.

The task of the threshold and decision logic circuit at 110 in the FIG. 1 drawing is, of course, to in some way select the signals representing true Fourier transform components present in the FIG. 2 output signals and reject the spurious signal components and also reject the true Fourier transform components which are of such low amplitude as to be nonuseful as identifying characteristics of the two input signals causing the FIG. 2 display. In the presence of the significant amplitude differences represented in FIG. 2, this separation can, of course, be accomplished on the basis of signal amplitude. A fixed decision threshold at a level such as the line of relative signal strength 60, as indicated at 220 in FIG. 2, may be employed in the FIG. 2 data to accomplish this decision. In the instance of other input signals of differing relative signal strengths, lower quality or greater noise content for example, it may be desirable to generate an intelligent or active decision threshold which is based on some average of input signal amplitudes or otherwise identifies only the one or two greatest amplitude peaks in a FIG. 2 or FIG. 3 type of Fourier transform spectrum.

When a radio receiver of the present invention type is employed as an electronic warfare receiver, a desired function of the receiver is the presentation of data identifying the nature of received radio frequency signals in a comprehensible and easily digested form, a form which requires as little of an operator's time, reasoning power and attention as is possible. It is, for example, desirable that any weighted or debatable decisions associated with the signals be accomplished by the receiver where both uniform and nonsubjective signal processing criteria can be invoked and a busy operator such as an aircraft pilot be thereby allowed to pursue other activities. Suitable formats for the output display of a receiver which accomplishes these desired functions may include, for example, an array of numeric values indicating frequency, signal strength, number of signals, modulation characteristics and perhaps direction of arrival or other signal identification information. The signal processing relating to several of these identifying characteristics is, of course, beyond the scope of the present invention; however, some form of output display as indicated at 112 in the FIG. 1 drawing is desired for those of these characteristics relating to the present invention. Such a display of signal characteristics may be in the form of identified numbers or as an additional example, be based on a graphical display as in the FIG. 2 drawing.

Figure 3:
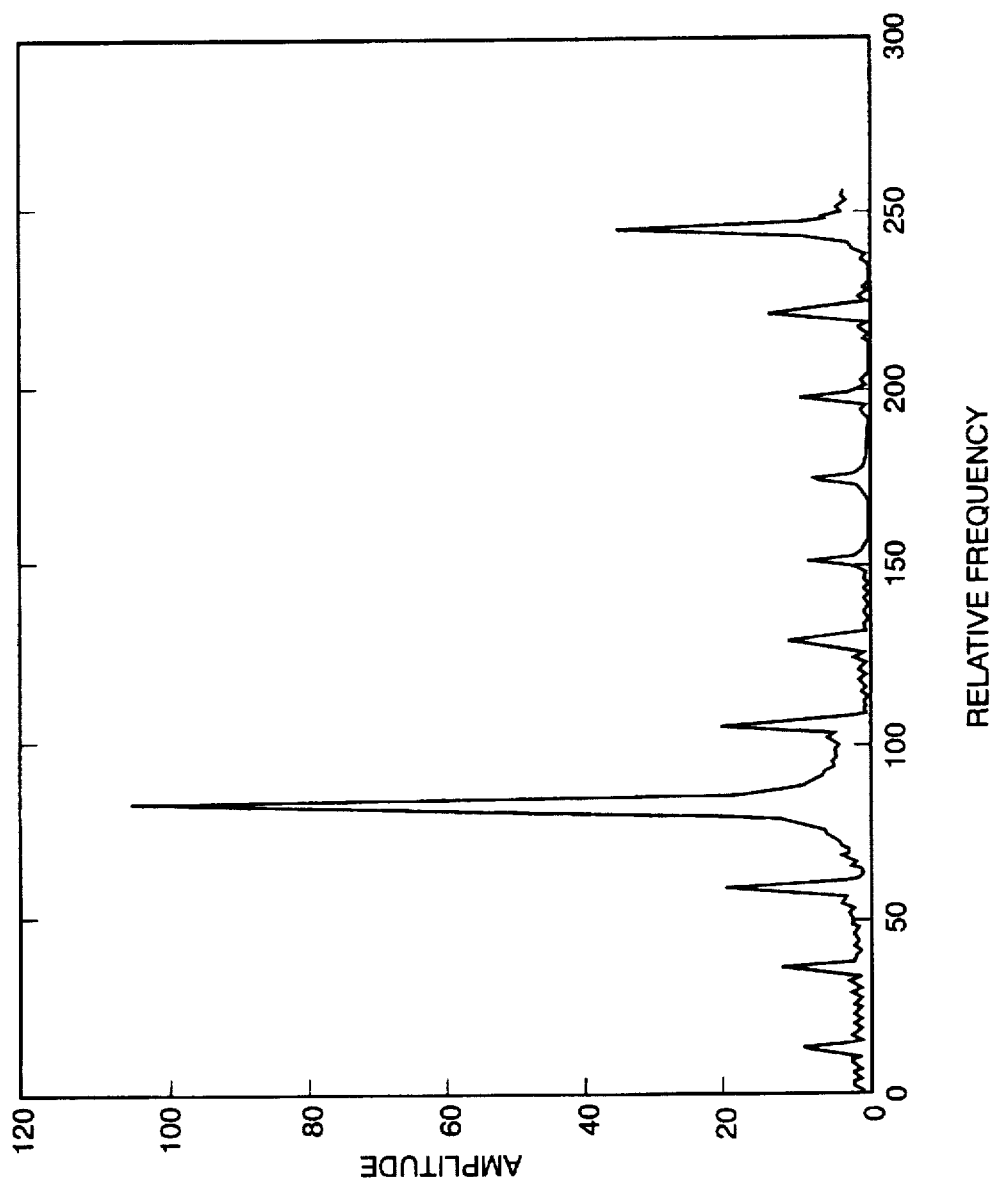
FIG. 3 shows a typical Fourier transform spectrum resulting from a single input signal to a radio receiver according to the present invention.

It may be appreciated from a study of the FIG. 2 Fourier transformation results display that the addition of a third input signal's components to the displayed results would complicate the signal processing and interpretation of output data represented in FIG. 2 in several respects. The simple addition of one more strong signal component such as 204 and 206 with its attending and inevitable difference in signal strength could, for example, raise questions as to a proper setting for the threshold 220 and increase the opportunity for confusion with the possibly spurious responses at 208 and 214. However, in contrast with this additional or third signal difficulty, the absence of one of the FIG. 2 represented two input signals provides a Fourier transform output spectrum which is somewhat cleaner and more easily interpreted than that shown in FIG. 2. An example of such a spectrum for a single input signal case is shown in the drawing of FIG. 3.

The presently disclosed receiver will generally, therefore, not generate erroneous frequency information under specific simultaneous signal conditions. A receiver of the disclosed type will moreover produce correct frequency information for a one-signal input condition. If there are simultaneous signals received, the receiver reports the frequency of the strong signal—when the second signal is much weaker than the first signal. If the second signal is similar to the first signal in signal amplitude, the receiver will report both frequencies. Therefore, the disclosed receiver reports correct signal frequency information and under frequently encountered conditions, the receiver will report the signal frequency information relating to two simultaneous signals.

The herein disclosed radio receiver therefore provides a viable replacement for the often-used instantaneous frequency measurement radio receiver. The disclosed receiver provides better receiver capabilities and is significantly simpler and, therefore, provides improvements in cost, reliability and maintainability as well. The ability to process more than one concurrent input signal is a significant capability improvement of the receiver.

While the apparatus and method herein described constitute a preferred embodiment of the invention, it is to be understood that the invention is not limited to this precise form of apparatus or method and that changes may be made therein without departing from the scope of the invention which is defined in the appended claims.

What is claimed is:

1. The method of characterizing one or two substantially coincident pulse-modulated electronic warfare radio frequency receiver signals, said method comprising the steps of:

converting said radio frequency receiver signals in real time from an incident analog format to a digital format of single binary bit amplitude coding;

generating a discrete Fourier transform representation of said single binary bit amplitude-coded radio frequency receiver signals, said generated Fourier transform representation including a plurality of Fourier transform coefficient signal outputs each of known Fourier frequency association and of magnitude determined by waveform characteristics of said radio frequency receiver signals;

determining by amplitude comparison of said Fourier transform coefficient signal outputs which of said Fourier transform coefficient signal outputs have sufficient signal amplitude to represent a true identifying characteristic frequency of said received radio frequency signals; wherein said radio frequency signals have a carrier frequency above one gigahertz and a pulse modulation rate between one-tenth microsecond and a continuous wave.

2. The method of characterizing one or two substantially coincident pulse-modulated electronic warfare radio frequency receiver signals, said method comprising the steps of:

converting said radio frequency receiver signals from an incident analog format to a digital format of single binary bit amplitude coding;

generating a discrete Fourier transform representation of said single binary bit amplitude-coded radio frequency receiver signals, said generated Fourier transform representation including a plurality of Fourier transform coefficient signal outputs each of known Fourier frequency association and of magnitude determined by waveform characteristics of said radio frequency receiver signals; and determining by amplitude comparison of said Fourier transform coefficient signal outputs which of said Fourier transform coefficient signal outputs have sufficient signal amplitude to represent a true identifying characteristic frequency of said received radio frequency signals; wherein said substantially coincident pulse-modulated electronic warfare radio frequency receiver signals include modulation pulse waveforms of less than one-tenth microsecond temporal segregation at one of their leading and trailing pulse edges.

3. Coincident signal-tolerant real time broadband electronic warfare radio receiver apparatus comprising the combination of:

a one-bit analog-to-digital converter circuit connected to receive analog electrical input signals communicated to said receiver, said analog-to-digital converter circuit including real time digital output signal generation capability at data rate frequencies comprising said receiver analog electrical input signals;

said one-bit analog-to-digital converter circuit generating an electrical output signal of positive one and negative one unitary magnitude in response to said receiver analog electrical input signals;

a discrete Fourier transform generating electrical circuit connected to an output signal port of said one-bit analog-to-digital converter circuit;

digital decision logic circuitry connected to an output signal port of said discrete Fourier transform-generating electrical circuit, said decision logic circuitry including a Fourier transform signal conversion threshold of selected magnitude; and operator communicating signal display apparatus connected with an output signal of said digital decision logic circuitry;

said wideband spectrum of radio frequency signals comprising signals above one gigahertz frequency and including pulse modulations.

4. The coincident signal-tolerant real time broadband electronic warfare radio receiver apparatus of claim 3 wherein said coincident signals comprise pulse modulated radio frequency carrier signals of greater than one gigahertz carrier frequency and between one-tenth microsecond and continuous wave pulse modulation frequency.

5. Coincident signal-tolerant real time broadband electronic warfare radio receiver apparatus comprising the combination of:

a one-bit analog-to-digital converter circuit connected to receive analog electrical input signals communicated to said receiver, said analog-to-digital converter circuit including real time digital output signal generation capability at data rate frequencies comprising said receiver analog electrical input signals;

said one-bit analog-to-digital converter circuit generating an electrical output signal of positive one and negative one unitary magnitude in response to said receiver analog electrical input signals;

a first bandpass electrical wave filter circuit capable of de-emphasizing input radio frequency signals outside of an input bandwidth of said receiver and connected to an output node of said one-bit analog-to-digital converter circuit;

a signal amplitude-limiting amplifier connected to an output port of said first bandpass electrical wave filter;

a second bandpass electrical wave filter connected to an output port of said signal amplitude-limiting amplifier and capable of excluding signals of spurious frequency generated in said signal amplitude-limiting amplifier;

a discrete Fourier transform generating electrical circuit connected to an output signal port of said second bandpass electrical wave filter;

digital decision logic circuitry connected to an output signal port of said discrete Fourier transform-generating electrical circuit, said decision logic circuitry including a Fourier transform signal conversion threshold of selected magnitude; and operator communicating signal display apparatus connected with an output signal of said digital decision logic circuitry.

* * * * *